United States Patent Office 3,833,670
Patented Sept. 3, 1974

---

3,833,670
2-[3,5-DI(TRIFLUOROMETHYL)PHENYL]
HEXAFLUORO-2-PROPANOL
Scott A. Reines, Fort Lee, N.J., assignor to the United States of America as represented by the Secretary of the Navy
No Drawing. Original application Feb. 4, 1971, Ser. No. 112,826, now Patent No. 3,707,483, dated Dec. 26, 1972. Divided and this application Oct. 17, 1972, Ser. No. 298,192
Int. Cl. C07c 33/00, 35/00
U.S. Cl. 260—618 D                    1 Claim

ABSTRACT OF THE DISCLOSURE

Fluorine-substituted benzyl monoglycidyl ethers and their precursors have been prepared containing a hexafluoroisopropyl group. These compounds are useful as coupling agents for bonding fluorinated monomers to chemically active surfaces, as fluorinated surface active agents, or as viscosity reducers for fluorinated epoxy resins.

---

This is a division of Ser. No. 112,826, filed Feb. 4, 1971, now U.S. Pat. 3,707,483, issued Dec. 26, 1972.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the Invention

This invention relates to monoglycidyl ethers and, more particularly, to fluorine-substituted benzyl glycidyl ethers and the intermediates therefore.

Description of the Prior Art

The use of epoxy resins as adhesives, in moldings, coatings, and as fillers is widely known. However, epoxy resins vary widely in their response to water and some of the strongest epoxies absorb the most water and are thereby most likely to become weakened on exposure to the elements. Future applications of epoxy compounds which are exposed to water are therefore critically dependent upon the ability of such compounds to resist the effects of weather and water. Among the classes of polymeric materials, those containing large percentages of fluorocarbon in the molecular structure are perhaps the least affected by water. Therefore, it would be advantageous to combine fluorocarbon units with glycidyl moieties so as to yield compounds having the unique bonding properties of fluorine. In copending U.S. Patent Application Ser. No. 13,172, filed Feb. 20, 1970, now abandoned, the above was accomplished by incorporating fluorocarbon segments into the molecular structures of epoxy resins. The present invention combines fluorine-substituted benzyl units with glycidyl moieties to obtain high fluorinated benzyl glycidyl ethers useful as hydrophobic coatings, coupling agents, and viscosity reducers for fluorinated epoxies.

SUMMARY OF THE INVENTION

In accordance with the present invention, novel fluorine-substituted monoglycidyl ethers are formed from aryl 2-hydroxyhexafluoropropyl compounds and epichlorohydrin by the following reaction:

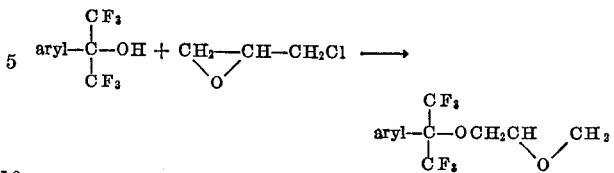

Additionally, novel intermediate aryl hexafluoroisopropyl compounds are provided which are used in the formation of the novel monoglycidyl ethers.

OBJECTS OF THE INVENTION

It is an object of the present invention to provide novel fluorine-substituted phenyl glycidyl ethers.

It is another object of the present invention to provide novel monoglycidyl ethers having fluorine groups on the non-glycidyl moieties.

It is a further object of the present invention to provide novel aryl 2-hydroxyhexafluoropropyl precursors for use in the preparation of novel fluorine-substitued phenyl monoglycidyl ethers.

Still other objects, features and attendant advantages of the present invention will become apparent to those skilled in the art from a reading of the following detailed description of preferred embodiments.

DESCRIPTION OF THE PREFERRED EMBODIMENTS

The monoglycidyl ethers of the present invention can be prepared by reacting aryl 2-hydroxyhexafluoropropyl compounds and epichlorohydrin in the presence of a basic solution such as an aqueous solution of sodium hydroxide. The intermediate aryl 2-hydroxyhexafluoropropyl compounds are synthesized via Grignard reaction of the aromatic bromide precursor with hexafluoroacetone. Specific embodiments of the intermediate preparation are described in the following three examples.

ARYL 2-HYDROXYHEXAFLUOROPROPYL INTERMEDIATES

Example I

Preparation of 2-(3-trifluoromethylphenyl)hexafluoro-2-propanol.—Forty-one grams of 3-bromobenzotrifluoride were gently heated for 0.5 hour in a stirred flask with 4.5 g. precleaned magnesium turnings. Twenty-two ml. of hexafluoroacetone were allowed to distill over into the flask at a rate to maintain a gentle reflux. This took about 1.5 hours. After reaction, excess 2 N HCl was used to decompose the magnesium salt that had formed and the reaction product was separated and cleaned with washings of ether and water. It was dried over anhydrous sodium sulfate. The solvent was evaporated under reduced pressure and the residue was fractionated through a 6-in. vacuum jacketed Vigreux column. 36 g. of the fraction boiling at 89° C./44 mm. Hg was collected as a clear, colorless liquid giving an overall yield of 63% based on the starting bromide. The product was alkali-soluble, and the NMR spectrum in carbon tetrachloride displayed signals at δ 8.02 (S, 1, Ar—H), 7.70 (m, 3, Ar—H), and 3.40 (s, O—H). The infrared spectrum had a sharp hydroxyl peak at 3600 cm.⁻¹ and a broad peak between 3500 and 3200⁻¹. Its structural formula was

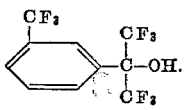

Example II

Preparation of 2-[3,5-di(trifluoromethyl)phenyl]hexafluoro-2-propanol.—This compound was prepared via the Grignard reaction in essentially the same manner as the preceding intermediate, except that a mixture of ether and tetrahydrofuran was required as solvent. Magnesium could not easily be induced to react with 3,5-di(trifluoromethyl)bromobenzene in dry ether alone. A 60-g. (0.205 mole) sample of the bromide gave an overall yield of 54.6 g. (70%) of the desired product. Bp. 85° to 90° C./40 mm. Hg; NMR signals: δ 8.20 (s, 2, AR—H), 8.03 (s, 1, AR—H), and 3.79 (s, 1, O—H). The infrared spectrum contained a sharp hydroxyl peak at 3610 cm.⁻¹. Its structural formula was

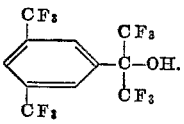

Example III

Preparation of 2-(pentafluorophenyl)hexafluoro-2-propanol.—This perfluorinated alcohol was synthesized via the Grignard reagent of pentafluorophenyl bromide in dry ether. In this case, the reaction between the Grignard reagent and hexafluoroacetone appeared to be usually sluggish, and it was necessary to heat the ethereal solution nearly to boiling to achieve a moderately rapid reaction. From 50 g. (0.20 mole) of bromide, 45 g. (64% overall yield) of the alcohol was obtained, B.P. 167° to 170° C./760 mm. Hg. The infrared spectrum had a sharp hydroxyl band at 3620 cm.⁻¹. Its structural formula was

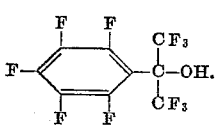

Fluorine-substituted monoglycidyl phenyl ethers.—The novel fluorine-substituted monoglycidyl ethers of the present invention are prepared by reacting the above-described intermediates with epichlorohydrin. They all are prepared in essentially the same manner and the following procedure for preparing 2-(3-trifluoromethylphenyl)hexa-2-propyl glycidyl ether is typical.

Example IV 2-(3-trifluoromethylphenyl) hexafluoro - 2-propyl glycidal ether.—Place 195 g. 2-(3-trifluoromethylphenyl) hexafluoro-2-propanol, 500 g. epichlorohydrin, 600 ml. acetone, and 70 ml. water into a round bottom flask equipped with a reflux condenser, stirrer, and dropping funnel. Into the dropping funnel place a 20% aqueous solution of sodium hydroxide containing 28.0 g. of the alkali. Add one-sixth of the alkali solution at 15 minute intervals or until reflux has substantially subsided. Draw off the aqueous layer and decant the remaining solution from the residual precipitate of sodium chloride. Dilute the solution with 300 ml. ether and wash with water and saturated aqueous sodium chloride solutions. Dry over anhydrous sodium sulfate, filter, and remove the ether on a rotary evaporator. The resulting solution is vacuum distilled through a 6-in. Vigreux column and the fraction boiling at 120° C./13 mm. Hg was collected. It weighed 180 g. resulting in 78% yield. This product was redistilled through a Nester Faust spinning band column to yield 151 g. of analytically pure product as described in Table I. Its structural formula is

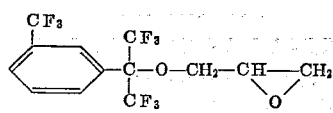

Example V

Preparation of 2-[3,5-di(trifluoromethyl)phenyl]hexafluoro-2-propyl glycidyl ether.—The procedure of Example IV was followed in reacting 54.5 g. (0.144 mole) of 2-[3,5 - di(trifluoromethyl)phenyl] hexafluoro-2-propanol with 55 ml. epichlorohydrin, 82 ml. acetone, and 11 ml. H₂O. 6.3 g. NaOH in 25 ml. H₂O were added in 6 equal portions at 15 minute intervals. Recovery procedure and results were as described in Example IV and Table II. The structural formula was

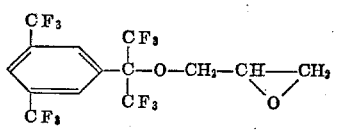

Example VI

Preparation of 2-(pentafluorophenyl)hexafluoro-2-propyl glycidyl ether.—Seventeen grams of 2-(pentafluorophenyl)hexafluoro-2-propanol were placed in a 100 ml. resin kettle with 40 ml. epichlorohydrin, 60 ml. acetone and 67 ml. H₂O. The solution was heated to reflux and 2.24 gm. NaOH in 9 ml. H₂O were added in 6 equal portions at 15 minute intervals. After the last alkali addition, reflux was continued for one hour. The product was recovered in essentially the same manner as Example IV to give a 38% yield of product as described in Tables I and II. The structural formula was

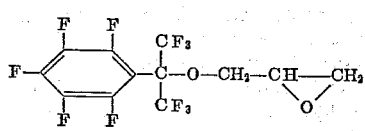

Table I sets forth analytical data for the fluorine-substituted benzyl monoglycidyl ethers.

TABLE I

| Compound | Formula | Carbon Calcd. | Carbon Found | Hydrogen Calcd. | Hydrogen Found | Fluorine Calcd. | Fluorine Found | Epoxy equivalent weight [1] Calcd. | Found |
|---|---|---|---|---|---|---|---|---|---|
| Example: | | | | | | | | | |
| IV | $C_{13}H_9F_9O_2$ | 42.40 | 42.21 | 2.46 | 2.54 | 46.44 | 46.40 | 368.2 | 369.1 |
| V | $C_{14}H_8F_{12}O_2$ | 38.55 | 38.56 | 1.85 | 1.94 | 52.27 | | 436.2 | 434.6 |
| VI | $C_{12}H_5F_{11}O_2$ | 36.94 | 36.97 | 1.29 | 1.28 | 53.57 | 53.67 | 390.2 | ([2]) |

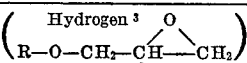

NMR Spectra

| | Aromatic | $H_a$[5] | $H_b$ | $H_c$[5] | Ar-C(CF$_3$)$_2$-OR | Ar-CF$_3$ | Ar-F |
|---|---|---|---|---|---|---|---|
| Example: | | | | | | | |
| IV | { 7.92 (1) <br> 7.68 (3) } | { 3.91 <br> 3.57 } | 3.20 | { 2.78 <br> 2.63 } | 71.6 [6] (doublet of quartets) | [6] 63.8 | |
| V | { 8.16 (2) <br> 8.03 (1) } | { 3.99 <br> 3.53 } | 3.25 | { 2.84 <br> 2.67 } | 71.4 (doublet of quartets) | 64.0 | |
| VI | | 3.63 | 3.18 | { 2.78 <br> 2.51 } | 72.7 [6] (triplet) | | { 145.9 [6] (2, broad). <br> 160.9 [6] (1, m.) (para). <br> 172.2 [6] (2, m.) (meta). } |

[1] Determined with 1N pyridine hydrochloride in pyridine.
[2] Pyridine hydrochloride method not applicable due to color formation.
[3] P.p.m. downfield from tetramethylsilane in CCl$_4$ solution.
[4] P.p.m. upfield from CCl$_3$F reference.
[5] Listing of dual signals for $H_a$ or $H_c$ indicates chemical nonequivalence of the geminal protons.
[6] In CCl$_4$.

TABLE II

| Compound | Yield,[1] percent | B.P. (° C./ 10.0 mm. Hg) | Refractive index, $n_D^{20}$ | Density[2] (g./cm.$^3$) | Surface tension[3] (dynes/cm.) | Viscosity[4] (cs.) | GLC retention time [5] (min.) Silicone 550 column | UCON 50-HB 2,000 column |
|---|---|---|---|---|---|---|---|---|
| Example: | | | | | | | | |
| IV | 78 | 108 | 1.4095 | 1.488 | 26.05 | 17.97 | 6.4 | 0.60 |
| V | 62 | 97 | 1.3901 | 1.605 | 23.25 | 25.20 | 2.8 | 0.39 |
| VI | 38 | 111 | 1.4074 | 1.720 | 27.39 | 39.40 | 5.5 | 0.57 |

[1] Percent conversion from corresponding hydroxy compound.
[2] Determined at 24° C.
[3] Determined at 23° C.
[4] Determined at 25° C.
[5] Determined at one time with fixed instrument settings: 160° C. column temperature and 35 p.s.i.g. He head pressure.

Table II describes physical data of the fluorine-substituted benzyl monoglycidyl ethers. All of the data was determined on analytically pure samples of the ethers which had been fractionally distilled on a spinning band column at 10.0 mm. Hg pressure.

As surface coupling agents, the fluorinated ethers of the present invention provide a means of attachment, via chemical bonding, of fluorocarbon monomers to a chemically active surface. This process may be used to achieve the desirable surface fluorocarbon properties of non-wetting, chemical inertness and thermal stability via in-situ coupling. Note that the surface tension of the commonly used phenyl glycidyl ether is 42.05 dynes/cm. compared to the lower more desirable values of the fluorinated compounds given in Table II.

The ethers of the present invention are also useful as viscosity modifiers of fluorinated epoxy resins. Heretofore materials such as phenyl glycidyl ether were used which resulted in a net reduction of fluorine in the resin. With the present fluorinated ethers, no reduction in the weight percentage of fluorine will result when they are added to the fluorinated epoxy resin.

Obviously many modifications and variations of the present invention are possible in light of the above teachings. It is therefore to be understood that within the scope of the appended claim the invention may be practiced otherwise than as specifically described.

What is claimed and desired to be secured by Letters Patent of the United States is:

1. 2 - [3,5 - di(trifluoromethyl)phenyl] hexafluoro-2-propanol.

References Cited

UNITED STATES PATENTS 3,544,535   12/1970   Gilbert et al. _____ 260—618 D

OTHER REFERENCES

Tarrant et al.: J. Org. Chem., 24, pp. 238 and 239 (1959).

Farah et al.: J. Org. Chem., 30, pp. 1006-7 (1965).

LEON ZITVER, Primary Examiner

D. B. SPRINGER, Assistant Examiner